United States Patent
Baumann et al.

(10) Patent No.: US 11,428,201 B2
(45) Date of Patent: Aug. 30, 2022

(54) ROTOR SHAFT UNIT

(71) Applicant: AKTIEBOLAGET SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 159 days.

(21) Appl. No.: 16/925,117

(22) Filed: Jul. 9, 2020

(65) Prior Publication Data
US 2021/0017951 A1    Jan. 21, 2021

(30) Foreign Application Priority Data

Jul. 16, 2019  (DE) .................... 102019210482.7

(51) Int. Cl.
*F03B 13/26* (2006.01)
*F03B 11/00* (2006.01)
*F03B 11/06* (2006.01)

(52) U.S. Cl.
CPC .......... *F03B 13/262* (2013.01); *F03B 11/006* (2013.01); *F03B 11/06* (2013.01)

(58) Field of Classification Search
CPC ...... F03B 13/262; F03B 11/006; F03B 11/06; F16C 2226/12; F16C 2226/16
USPC .................................................. 290/42, 53
See application file for complete search history.

(56) References Cited

U.S. PATENT DOCUMENTS

| 3,388,880 | A |   | 6/1968 | Knight |   |
|---|---|---|---|---|---|
| 4,596,477 | A | * | 6/1986 | Lundgren | F16C 35/073 384/538 |
| 6,024,496 | A | * | 2/2000 | Shy | F16C 33/74 384/279 |
| 6,321,875 | B1 | * | 11/2001 | Mihalak | F16C 33/6622 184/5.1 |
| 2005/0058520 | A1 | * | 3/2005 | Ricker | F16B 31/02 411/14 |
| 2012/0200084 | A1 |   | 8/2012 | Blaxland et al. |   |
| 2015/0300496 | A1 | * | 10/2015 | Nakanishi | F16J 15/16 277/540 |

(Continued)

FOREIGN PATENT DOCUMENTS

| DE | 3248097 A1 | 6/1984 |
|---|---|---|
| DE | 3635203 C1 | 3/1988 |

(Continued)

OTHER PUBLICATIONS

Search Report from the European Patent Office dated Dec. 4, 2020 in related EP application No. 20 18 5610.1, and translation thereof.

*Primary Examiner* — Charles Reid, Jr.
(74) *Attorney, Agent, or Firm* — J-Tek Law PLLC; Scott T. Wakeman; Mark A. Ussai

(57) ABSTRACT

A rotor shaft unit for a tidal system, which tidal system includes a main frame and a rotor and a housing connected to the rotor, includes a rotor shaft configured to be connected to the main frame, at least one bearing unit for rotatably supporting the housing for rotation relative to the rotor shaft, and a sleeve configured to be mounted in the main frame, the sleeve being disposed around a first end portion of the rotor shaft and connected to the rotor shaft by a friction connection. Also a tidal system including the rotor shaft unit.

19 Claims, 1 Drawing Sheet

(56) References Cited

U.S. PATENT DOCUMENTS

2017/0089319 A1 * 3/2017 Hofmann .............. F03B 17/061

FOREIGN PATENT DOCUMENTS

| EP | 0878271 A2 * | 11/1998 | ............. B25B 27/06 |
| WO | WO-2009049269 A1 * | 4/2009 | ............ F03B 13/262 |
| WO | WO-2014146742 A1 * | 9/2014 | ........... B25B 27/064 |

* cited by examiner

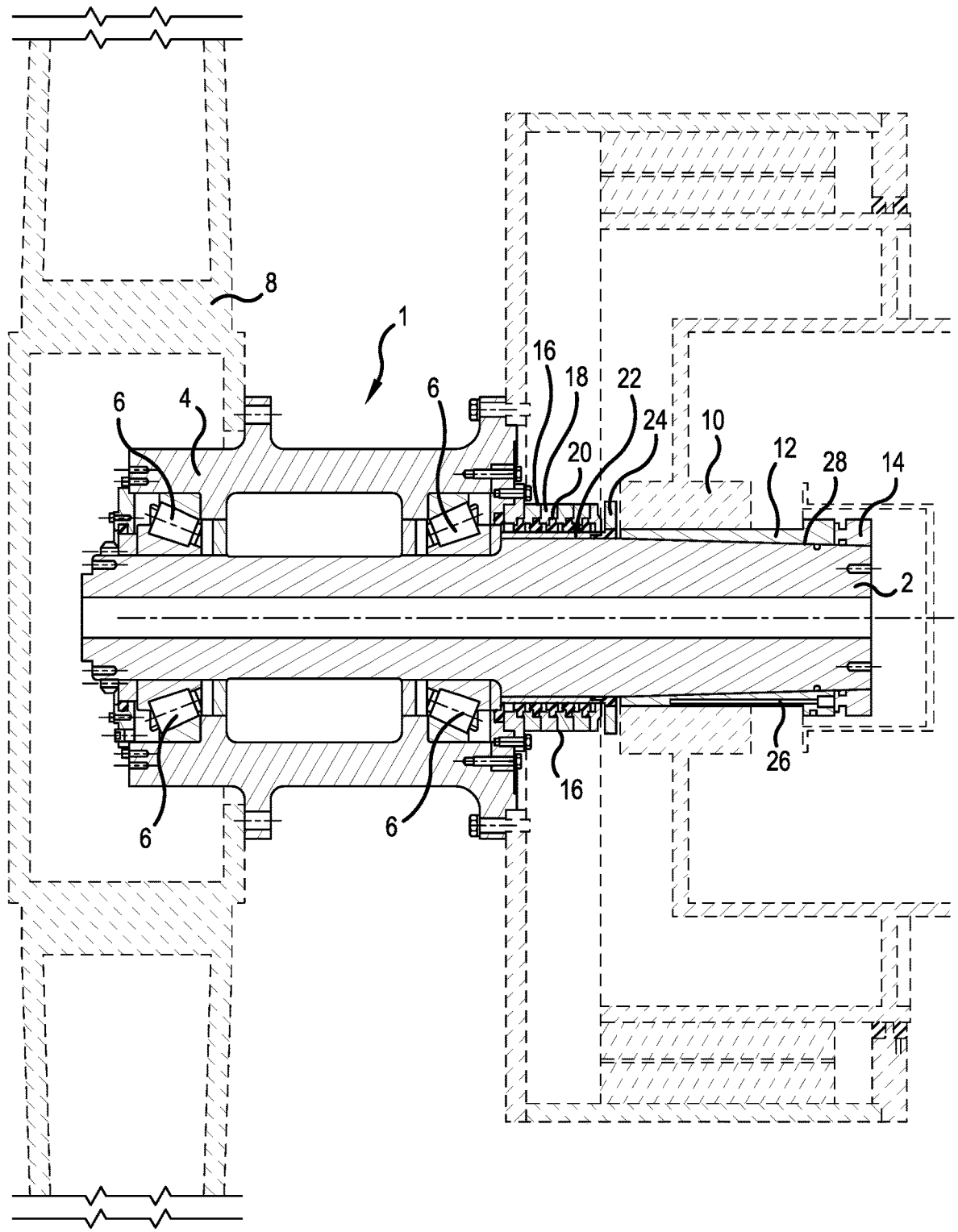

ROTOR SHAFT UNIT

CROSS-REFERENCE

This application claims priority to German patent application no. 10 2019 210 482.7 filed on Jul. 16, 2019, the contents of which are fully incorporated herein by reference.

TECHNOLOGICAL FIELD

The present disclosure is directed to a rotor shaft unit having a rotor shaft configured to connect to a main frame of a tidal system and at least one bearing unit for supporting the rotor shaft in a housing configured to be connected to a rotor of the tidal system.

BACKGROUND

In energy systems such as, for example, wind turbines, stationary rotor shafts may be used as kingpins in order to rotatably support a rotor. The rotor shaft is usually supported by one or more bearing units in a housing connected to a rotor of the tidal system. At the other end of the rotor shaft the rotor shaft is fixedly connected to a main frame of the tidal system. A connection of the rotor shaft to the main frame can be produced via a rotor-shaft flange connection. However, such a connection is expensive to manufacture and assemble, and in particular removal of the rotor shaft is complex. Furthermore, such a flange connection in a tidal system makes it difficult to access to a seal unit that is disposed around the rotor shaft in order to seal the one or more bearing units toward the main frame. Maintenance of the seal unit would therefore also be very complex.

SUMMARY

It is therefore an aspect of the present disclosure to provide a rotor shaft unit that can be easily mounted on a main frame of a tidal system and removed as required.

The rotor shaft unit includes a rotor shaft that is configured to be connected to a main frame of the tidal system and at least one bearing unit for supporting the rotor shaft in a housing, which housing is configured to be connected to a rotor of the tidal system. Instead of connecting the rotor shaft to the main frame using a known flange connection, in the disclosed rotor shaft unit a sleeve is provided that is disposed around the rotor shaft and attached to the main frame. Here a connection of the sleeve to the rotor shaft is effected by a friction connection.

Since the sleeve is used for attaching the rotor shaft to the main frame of the generator instead of a flange connection, there is no fixed flange connection between rotor shaft and main frame, and thus the rotor shaft can simply be pulled out from sleeve that remains in the main frame, or pulled out together with the sleeve from the main frame, in order to, for example, exchange a seal unit on the rotor shaft. This furthermore offers the advantage that the rotor shaft can be manufactured from a cylindrical steel tube, and it is not necessary to produce a flange on or to weld a flange onto the rotor shaft. The connection between the rotor shaft and the sleeve is effected only by the friction connection without further attachment means being required.

According to one embodiment, the sleeve is first pushed into a bore of the main frame. The rotor shaft is then introduced into the sleeve. Here the sleeve is held in the main frame via a friction connection, and the rotor shaft is also held in the sleeve via a friction connection.

The friction connection can be achieved, for example, by a tapered seat between the sleeve and the rotor shaft or by a jamming of the rotor shaft with the sleeve. Other types of friction or friction-fit connection are also possible.

In order to achieve a tapered seat between the rotor shaft and the sleeve, according to a further embodiment the outer circumference of the rotor shaft and/or the inner bore of the sleeve can be conical. Due to the conical design of the rotor shaft and/or of the sleeve, the sleeve can be simply pushed onto the rotor shaft and secured by a tapered seat.

According to a further embodiment, the outer circumference of the sleeve is cylindrical. Here the bore of the main frame, into which the sleeve is pushed, can also be configured cylindrical. Due to the pushing of the sleeve onto the rotor shaft, or the inserting of the rotor shaft into the sleeve, the sleeve is attached to the rotor shaft by the tapered seat and simultaneously somewhat expanded and thereby secured in the bore of the main frame. Alternatively or additionally, due to the insertion of the rotor shaft into the sleeve, the sleeve can be pushed further into the bore of the main frame and thereby jammed there.

The friction connection can thus be achieved by a tapered seat between the sleeve and the rotor shaft, but alternatively also by a tapered seat between the sleeve and the main frame. In the first case the rotor shaft and the inner circumference of the sleeve are configured conical, and the outer circumference of sleeve and the inner circumference of the bore are configured cylindrical. In the second case the rotor shaft and the inner circumference of the sleeve are configured cylindrical, and the outer circumference of the sleeve and the inner circumference of the bore are configured conical as a tapered seat. In both variants a jamming of the rotor shaft by the sleeve is achieved. Other types of friction or friction-fit connection are also possible.

Alternatively the sleeve can also be configured two-part and comprise two partial sleeves lying one-inside-the-other, wherein the outer circumference of the inner sleeve and the inner circumference of the outer sleeve together form a conical tapered seat, and the inner circumference of the inner sleeve and the outer circumference of the outer sleeve are configured cylindrical. In this case the rotor shaft and the bore in the housing can also be configured cylindrical. In this case a press-connection is achieved by an axial displacement of the two sleeves relative to each other. In all cases a connection of the rotor shaft to the housing is achieved via a tapered seat that effects the friction connection between the rotor shaft and the sleeve.

According to a further embodiment a hydraulic nut for generating the friction connection is provided at one end of the sleeve. The hydraulic nut can be acted upon via a connecting hose with pressure that pushes the sleeve axially onto the rotor shaft. For example, when it is already disposed in the bore of the main frame, the sleeve can be pushed a bit out of the main frame and onto the rotor shaft.

Due to the pressure that is exerted by the hydraulic nut on the sleeve, the sleeve is pressed axially onto the rotor shaft by a precisely determined pressure. Due to this contact pressure between the rotor shaft and the sleeve, the connection is also generated between the cylindrical outer surface of the sleeve and the bore of the main frame.

The contact pressure therefore ensures both a reliable connection between the rotor shaft and the sleeve and between the sleeve and the main frame. In this way the rotor shaft is securely and reliably attached to the main frame.

In order to be able to again release the rotor shaft and sleeve from each other, according to a further embodiment an oil groove can be provided between the rotor shaft and the sleeve. The oil groove can be implemented either in the rotor shaft or in the sleeve, or in both. In order to release the sleeve and the rotor shaft from each other, oil can be introduced into the oil groove in order to provide a sliding film between the rotor shaft and the sleeve. Due to this sliding film the friction connection can be released, and the rotor shaft and the sleeve can be simply shifted in the sliding film against each other and thereby can be released from each other. The pressure that is exerted by the hydraulic nut is preferably first released.

According to one embodiment, the rotor shaft unit includes at least one seal unit that is disposed around the rotor shaft and configured for sealing the bearing unit toward the main frame. The sleeve can be disposed axially between the seal unit and the main frame. If the sleeve for the friction connection is pushed onto the rotor shaft in the axial direction, or the rotor shaft is pushed into the sleeve in the axial direction, the sleeve can come into abutment against the seal unit and thus exert a pressure on the seal unit in the axial direction. In this way an axial securing of the seal unit is possible due to the sleeve.

Releasing the rotor shaft and the sleeve from each other can be necessary, for example, when the seal unit that seals the bearing unit toward the main frame is damaged and should be exchanged. The seal unit can be exchanged as an entire module, or the seal unit can include a plurality of seal carrier rings, each including a seal lip, so that the seal carrier rings are individually exchangeable. By releasing the rotor shaft from the sleeve and pulling it from the sleeve, a simple access to the seal unit is possible in order to exchange it. The seal unit can be pulled axially as a whole from the rotor shaft, since in the pulling-off direction of the seal unit the rotor shaft at no point has a larger diameter than the inner diameter of the seal unit. This is achieved by the special arrangement of the sleeve.

Another embodiment comprises a tidal system including a main frame having an opening and a sleeve mounted in the opening, the sleeve having an inner surface, the inner surface having a diameter decreasing in a first direction. The system also includes a rotor and a housing attached to the rotor and a rotor shaft having a first end mounted in the sleeve and a second end extending into the housing. The first end has an outer surface, and the outer surface of the first end has a diameter that decreases in the first direction. The system also includes at least one bearing supporting the housing on the second end of the rotor shaft for rotation relative to the rotor shaft and a mechanism for biasing the rotor shaft relative to the sleeve to hold the outer surface of the first end against the inner surface of the sleeve to increase friction between the outer surface of the first end and the inner surface of the sleeve.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a longitudinal section of a rotor shaft unit according to an embodiment of the present disclosure.

DETAILED DESCRIPTION

In the following, identical or functionally equivalent elements are designated by the same reference numbers.

FIG. 1 shows a longitudinal section of a rotor shaft unit 1 for a tidal system. The rotor shaft unit 1 includes a rotor shaft 2 that is supported in housing 4 via bearing units 6. The housing 4 is connected to a rotor 8 of the tidal system. The rotor shaft 2 is stationary and attached to a main frame 10 of the tidal system. In order to permit a simple and flexible attachment of the rotor shaft 2 to the main frame 10, a sleeve 12 is disposed in a bore of the main frame 10. The rotor shaft 2 is pushed into this sleeve 12, and the sleeve 12 and the rotor shaft 2 are connected to each other by a friction connection. In the embodiment shown here the friction connection is realized by a tapered seat.

As depicted in FIG. 1, the outer circumference of the rotor shaft 2 and the inner diameter of sleeve 12 each have a conical shape. Other shapes are also possible. A hydraulic nut 14 is provided for attaching the sleeve 12 and the rotor shaft 2 to each other. This hydraulic nut 14 additionally serves to secure the sleeve 12 axially.

To attach the rotor shaft 2 to the main frame 10, the sleeve 12 is first pushed into the main frame 10. The rotor shaft 2 is then pushed into sleeve 12. The hydraulic nut 14 is then acted upon by a pressure, wherein the pressure presses the sleeve 12 toward the rotor shaft 2, i.e., leftward in the FIGURE. In this way the friction connection is produced between the rotor shaft 2 and the sleeve 12. Here the sleeve 12 is pushed again somewhat out of the main frame 10.

The sleeve 12 has an outer circumference that is cylindrical and is disposed in the bore of the main frame 10. Pushing the sleeve 12 onto the rotor shaft 2 expands the sleeve to a degree and thereby also seats the sleeve firmly in the main frame 10 due to a friction connection.

A seal unit 16 is provided between the sleeve 12 and the housing 4 for sealing the bearing units 6. This seal unit includes a plurality of seal carrier rings 18 that each include a seal lip 20. The seal lips 20 slip on a disc 22 that is disposed around the rotor shaft 2. Alternatively the seal disc 22 can also be implemented by the rotor shaft 2 itself (that is, the seal lips 20 can slip directly on a portion of the rotor shaft 2). When the rotor shaft 2 is pushed into sleeve 12, the sleeve 12 presses against the seal unit 16 or against a protective anode 24 that is disposed on the seal unit 16. Due to the presence of the sleeve 12 the seal unit 16 is also additionally secured in the axial direction, since due to the axial pressure of the hydraulic nut 14 the sleeve 12 abuts against the seal unit 16.

To assemble the entire rotor shaft unit 1, the bearing units 6 and the housing 4, as well as the associated seal units 6, are first attached to the rotor shaft 2. The rotor shaft 2 is then attached as entire rotor shaft unit 1 to the main frame 10 by pushing the rotor shaft 2 into the sleeve 12.

To remove the rotor shaft unit 1 from the main frame 10, an oil groove 26 (in FIG. 1 implemented in the sleeve 12) can be provided in the rotor shaft 2 or in the sleeve 12, or in both. Oil can be introduced in the oil groove 26 in order to generate a sliding film in the region 28 between the sleeve 12 and the rotor shaft 2. This sliding film allows the friction connection between the rotor shaft 2 and the sleeve 12 to be released, and the rotor shaft 2 can thus be easily removed from the sleeve 12. Removing the rotor shaft 2 in this manner also permits a simple access to the seal unit 16 in order to exchange the seal unit 16 as a whole, or to exchange individual seal carrier rings or seal lips 20.

The rotor shaft unit disclosed herein allows for a simple installation and removal of a rotor shaft unit onto a main frame of a generator. Furthermore, the manufacturing of the rotor shaft is simplified because no flange needs to be produced thereon for attaching to the main frame.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rotor shaft units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rotor shaft unit
2 Rotor shaft
4 Housing
6 Bearing units
8 Rotor
10 Main frame
12 Sleeve
14 Hydraulic nut
16 Seal unit
18 Seal carrier rings
20 Seal lip
22 Seal disc
24 Protective anode
26 Oil groove
28 Region between sleeve and rotor shaft

What is claimed is:

1. A rotor shaft unit for a tidal system, the tidal system having a main frame having an opening, a rotor, and a housing connected to the rotor, the rotor shaft unit comprising:
a rotor shaft configured to support the rotor and the housing, the rotor shaft having a first end portion configured to be received in the opening of the main frame,
at least one bearing unit for rotatably supporting the housing for rotation relative to the rotor shaft, and
a sleeve configured to be mounted in the opening of the main frame in a rotationally fixed manner and to receive the first end portion of the rotor shaft and be connected to the first end portion of the rotor shaft by a friction connection.

2. The rotor shaft unit according to claim 1, wherein the friction connection between the first end portion of the rotor shaft and the sleeve is produced by a tapered seat.

3. The rotor shaft unit according to claim 1, wherein an outer circumference of the first end portion of the rotor shaft and/or an inner bore of the sleeve is conical.

4. The rotor shaft unit according to claim 1, including a hydraulic nut for biasing the rotor shaft relative to the sleeve to generate the friction connection.

5. The rotor shaft unit according to claim 1, including an oil groove a) formed in the shaft and open toward the sleeve or b) formed in the sleeve and open toward the shaft.

6. The rotor shaft unit according to claim 1, including at least one seal unit disposed around the rotor shaft and configured to seal the bearing unit toward the main frame,
wherein the seal unit is disposed between the housing and the main frame.

7. The rotor shaft unit according to claim 6, wherein the seal unit is exchangeable.

8. The rotor shaft unit according to claim 7, wherein the seal unit includes a plurality of seal carrier rings, and wherein each seal carrier ring includes a seal lip.

9. The rotor shaft unit according to claim 8, wherein the seal carrier rings are individually exchangeable.

10. The rotor shaft unit according to claim 1, wherein the first end of the rotor shaft has an outer diameter that decreases in a first direction and wherein an inner diameter of the sleeve decreases in the first direction.

11. A tidal system comprising:
a main frame;
a rotor;
a housing connected to the rotor, and
the rotor shaft unit according to claim 1,
wherein the sleeve is mounted in the opening of the main frame,
wherein the first end portion of the rotor shaft is mounted in the sleeve, and
wherein a second end portion of the rotor shaft supports the at least one bearing unit.

12. The tidal system according to claim 11, wherein an outer circumference of the rotor shaft and/or an inner bore of the sleeve is conical, and
including a hydraulic nut biasing the shaft against to the sleeve.

13. The tidal system according to claim 12, including a seal assembly mounted around the rotor shaft axially between the housing and the main frame.

14. The rotor shaft unit according to claim 1, wherein the first end portion of the rotor shaft is rotationally fixed in the opening.

15. A tidal system comprising:
a main frame including an opening;
a sleeve mounted in the opening, the sleeve having an inner surface, the inner surface having a diameter decreasing in a first direction;
a rotor and a housing attached to the rotor, a rotor shaft having a first end mounted in the sleeve and a second end extending into the housing, the first end having an outer surface, the outer surface of the first end having a diameter decreasing in the first direction, at least one bearing supporting the housing on the second end of the rotor shaft for rotation relative to the rotor shaft, and means for biasing the rotor shaft relative to the sleeve to hold the outer surface of the first end against the inner surface of the sleeve to increase friction between the outer surface of the first end and the inner surface of the sleeve.

16. The tidal system according to claim 15, wherein the means for biasing comprises a hydraulic nut.

17. The tidal system according to claim 15, wherein the rotor shaft the sleeve and the at least one bearing support form a rotor shaft unit.

18. The tidal system according to claim 15, wherein the sleeve is rotationally fixed relative to the main frame.

19. The tidal system according to claim 18, wherein the rotor shaft is rotationally fixed relative in the sleeve.

\* \* \* \* \*